United States Patent
Hadar (10) Patent No.: US 8,898,304 B2
(45) Date of Patent: Nov. 25, 2014

(54) MANAGING ACCESS TO RESOURCES OF COMPUTER SYSTEMS USING CODIFIED POLICIES GENERATED FROM POLICIES

(75) Inventor: Eitan Hadar, Nesher (IL)

(73) Assignee: CA, Inc., New York, NY (US)

( * ) Notice: Subject to any disclaimer, the term of this patent is extended or adjusted under 35 U.S.C. 154(b) by 145 days.

(21) Appl. No.: 13/546,814

(22) Filed: Jul. 11, 2012

(65) Prior Publication Data

US 2014/0019617 A1  Jan. 16, 2014

(51) Int. Cl.
*G06F 15/16* (2006.01)
*G06F 15/167* (2006.01)
*G06F 15/177* (2006.01)
*G06F 15/173* (2006.01)

(52) U.S. Cl.
USPC .......................... 709/225; 709/223; 709/229

(58) Field of Classification Search
CPC ................... H04L 29/06578; H04L 29/06986; H04L 29/08144; H04L 63/08
USPC .......................................... 709/223, 224, 225
See application file for complete search history.

(56) References Cited

U.S. PATENT DOCUMENTS

| | | | |
|---|---|---|---|
| 7,877,780 B2 * | 1/2011 | Kolawa et al. | 726/1 |
| 2004/0103317 A1 * | 5/2004 | Burns | 713/201 |
| 2009/0254392 A1 * | 10/2009 | Zander | 705/7 |
| 2011/0072486 A1 | 3/2011 | Hadar et al. | |
| 2011/0072487 A1 | 3/2011 | Hadar et al. | |

FOREIGN PATENT DOCUMENTS

WO   WO 0056027   *   9/2000

* cited by examiner

*Primary Examiner* — Vivek Srivastava
*Assistant Examiner* — Hermon Asres
(74) *Attorney, Agent, or Firm* — Myers Bigel Sibley & Sajovec, P.A.

(57) ABSTRACT

A computer system is disclosed that includes a policy repository, a policy codifier, and a policy manager. The policy repository contains policies. The policy codifier generates codified policies from the policies. The policy manager manages access to resources of the computer system responsive to the codified policies. Related methods and computer program products for operating computer systems are also disclosed.

16 Claims, 5 Drawing Sheets

MANAGING ACCESS TO RESOURCES OF COMPUTER SYSTEMS USING CODIFIED POLICIES GENERATED FROM POLICIES

BACKGROUND

The present disclosure relates to computer systems, and in particular to managing access to resources of computer systems, such as in virtualized computer environments.

Virtualized computer environments, also referred to as cloud computer systems or composite information technology systems, are used to provide computer resources or other computing resources to end users. In a cloud computer environment, the physical hardware configuration is hidden from the end user. Cloud computer systems may include servers, network storage devices, routers, gateways, communication links, software (e.g., applications, operating systems, web services, etc.), and other devices. However, because the physical hardware and software platforms on which cloud computer system is implemented are hidden within a "cloud," they can be managed, upgraded, replaced or otherwise changed by a system administrator without the customer being aware of or affected by the change.

In a typical cloud computer environment, applications may be executed on virtual machines or appliances, which are isolated guest operating systems installed within a host system and an optional preset configuration and structure (e.g., combination of operating system and web server). Virtual machines are typically implemented with software emulation, hardware virtualization, or both. A single hardware and/or software platform may host a number of virtual machines, each of which may have access to some portion of the platform's resources, such as program code processing resources, storage resources, display resources, communication interfaces, etc.

Because cloud computing treats computer resources as remote services that are accessed by customers, and because the actual physical resources that are used to implement a cloud computing environment may be accessed by many different customers, security is an important aspect of cloud computing. In a cloud computing environment, different customers may have different security requirements. Hosting applications that have different security requirements in a single cloud computer system may raise additional security issues, however. For example, when highly secured systems are hosted along with lower security systems, an attacker may attempt to leverage the lower security system to gain access to the highly secured systems.

Security policies can be used to define security rules for managing machines, including applications, OS, hypervisors, cloud environments, servers, mobile devices, and/or IP based instrumentations, etc. The policies usually contain rules (actions) that are associated with identified managed machines (e.g., IDs of devices and/or applications, and/or types of machines), and may identify authorized groups (e.g., privileged users and/or systems). The rules can be created by many different users and/or management systems to address resource access restrictions (e.g., privileged users), architecture restrictions (e.g., application A should not be co-located with application B due to scale and load), and/or or business restrictions (e.g., a credit card transaction processing system should not be co-hosted on a same hardware platform as a customer contact list management system).

BRIEF SUMMARY

Some embodiments disclosed herein are directed to a computer system that includes a policy repository, a policy codifier, and a policy manager. The policy repository contains policies. The policy codifier generates codified policies from the policies. The policy manager manages access to resources of the computer system responsive to the codified policies.

In some further embodiments, the policy codifier can substitute symbols for semantic terms in the policies to generate the codified policies, count occurrences of the representations of the categories within a structure of a selected one of the codified policies, and de-duplicate identical entries within the structure to condense the structure for the selected codified policy. The policy manager can communicate the condensed structure for the selected codified policy to a managed machine.

In some further embodiments, the policy manager can determine which of the codified policies to deploy to which of the managed machines in response to comparing similarity of the codified policies associated with different ones of the managed machines. Similarity of the codified policies may be determined by counting occurrences of at least one of: 1) identical symbols occurring between the structures of at least two of the codified policies associated with at least two of the managed machines; and 2) identical rows of symbols occurring between the structures of at least two of the codified policies associated with at least two of the managed machines. Similarity of the codified policies may alternatively or additionally be determined from a distance between identical rows of symbols occurring between the structures of at least two of the codified policies associated with at least two of the managed machines.

Some other embodiments are directed to related methods and computer program products.

It is noted that aspects described with respect to one embodiment may be incorporated in different embodiments although not specifically described relative thereto. That is, all embodiments and/or features of any embodiments can be combined in any way and/or combination. Moreover, other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The accompanying drawings, which are included to provide a further understanding of the present disclosure and are incorporated in and constitute a part of this application, illustrate certain embodiment(s). In the drawings.

DETAILED DESCRIPTION

Embodiments of the present disclosure will be described more fully hereinafter with reference to the accompanying drawings. Other embodiments may take many different forms and should not be construed as limited to the embodiments set forth herein. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

The terminology used herein is for the purpose of describing particular embodiments only and is not intended to be limiting to other embodiments. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

Various embodiments disclosed herein are directed to generating and analyzing policies which are used to manage access by machines to resources of a computer system. The managed machines may be hardware, software, or combination of hardware and software (e.g., computing circuits/devices/systems, servers, virtualized computing environments, etc.), as described below. Policies can become difficult to deploy within a computer system, manage, and analyze as the number of managed machines increases. The size and the number of polices or component rules therein can rapidly grow due, for example, to replication of identical or similarly policies and/or component rules of policies. Differences between policies can arise with differences in the informational needs of the managed machines, differences in the individual(s) or group(s) granted privileged access to the managed machines, differences in the machine and/or human languages used to a express same/similar component rules of polices, differences in policy compliance trigger conditions, differences in the actions that are run responsive to the conditions, and/or differences in what information is reported by different managed machines. Moreover, policies may initially be the same but then change differently over time, resulting in decreasing similarity over time between the policies. Regardless of the reasons, the structures of polices can become cumbersome for analysis by computerized analytical tools and become burdensome to deploy and manage in a computer system.

Various disclosed embodiments provide a computer system that generates codified policies from policies within a policy repository, and uses the codified policies to manage access to resources of the computer system. Non-limiting example embodiments are described below in the context of FIGS. 1-7.

Figure 1:
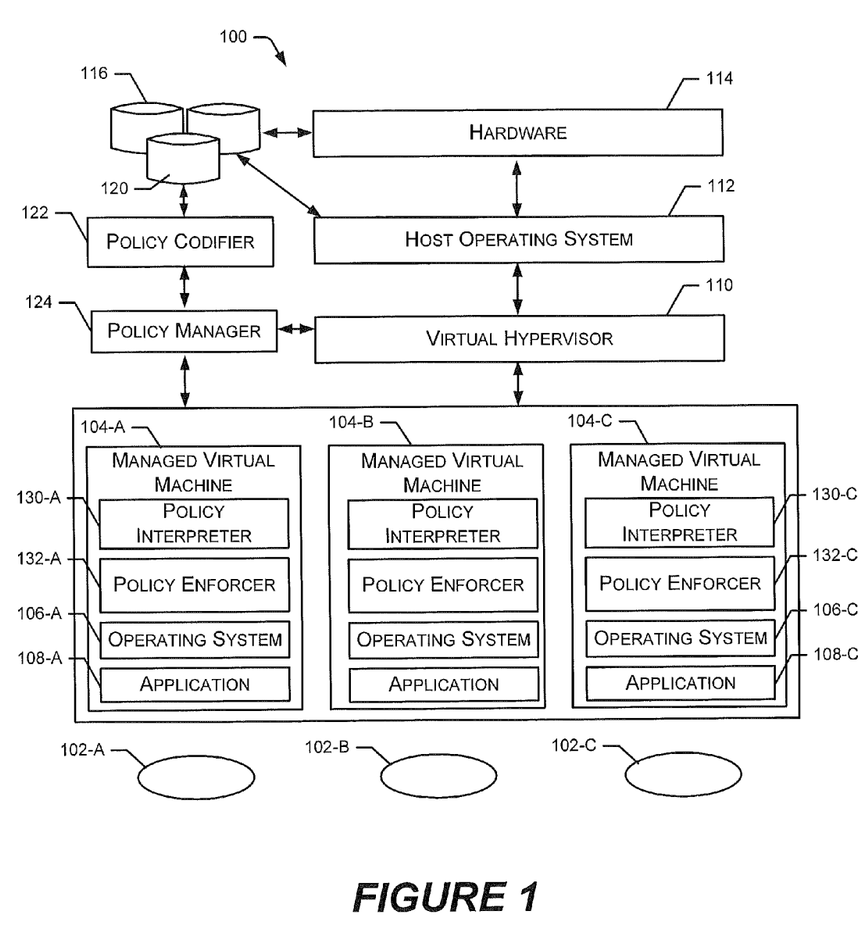
FIG. 1 is a block diagram of a computer system that manages access by managed machines to resources of the computer system responsive to codified policies.

FIG. 1 illustrates a computer system 100 for a virtualized computing environment in which the subject matter of the present disclosure can be embodied. Although various embodiments are described in the context of a virtualized computing environment, the invention is not limited thereto and may be used to manage access to resources of non-virtual computer environments. The computer system 100 generally hosts and manages one or more virtual machines 104 (hereafter managed virtual machine, or managed machine), each of which runs a guest operating system 106 and application 108. The computing needs of users 102 (e.g., humans and/or other virtual/non-virtual machines) drive the functionality of the managed machines 104. A virtual hypervisor 110 can provide an interface between the managed machines 104 and a host operating system 112 and allow multiple guest operating systems 106 and associated applications 108 to run concurrently. The host operating system 112 handles the operations of a hardware platform 114 capable of implementing managed machines 104. A data storage space 116 may be accessed by the host operating system 112 and is connected to the hardware platform 114.

The hardware platform 114 generally refers to any computer system capable of implementing managed machines 104, which may include, without limitation, a mainframe computer platform, personal computer, mobile computer (e.g., tablet computer), server, wireless communication terminal (e.g., cellular data terminal), or any other appropriate program code processing hardware. The hardware platform 114 may include computer resources such as a processing circuit(s) (e.g., central processing unit, CPU); networking controllers; communication controllers; a display unit; a program and data storage device; memory controllers; input devices (such as a keyboard, a mouse, etc.) and output devices such as printers. The processing circuit(s) is configured to execute computer program code from memory device(s), described below as a computer readable storage medium, to perform at least some of the operations and methods described herein, and may be any conventional processor circuit(s), such as the AMD Athlon™ 64, or Intel® Core™ Duo.

The hardware platform 114 may be further connected to the data storage space 116 through serial or parallel connections. The data storage space 116 may be any suitable device capable of storing computer-readable data and program code, and it may include logic in the form of disk drives, random access memory (RAM), or read only memory (ROM), removable media, or any other suitable memory component. According to the illustrated embodiment, the host operating system 112 functionally interconnects the hardware platform 114 and the users 102 and is responsible for the management and coordination of activities and the sharing of the computer resources.

Although some embodiments of the computer system 100 can be configured to operate as a computer server, the computer system 100 is not limited thereto and can be configured to provide other functionality, such as data processing, communications routing, etc.

Besides acting as a host for computing applications that run on the hardware platform 114, the host operating system 112 may operate at the highest priority level in the system 100, executing instructions associated with the hardware platform 114, and it may have exclusive privileged access to the hardware platform 114. The priority and privileged access of hardware resources affords the host operating system 112 exclusive control over resources and instructions, and may preclude interference with the execution of different application programs or the operating system. The host operating system 112 can create an environment for implementing a virtual machine, hosting the "guest" virtual machine. One host operating system 112 is capable of implementing multiple isolated virtual machines simultaneously.

A virtual hypervisor 110 (which may also be known as a virtual machine monitor or VMM) runs on the host operating system 112 and provides an interface between the managed machine 104 and the hardware platform 114 through the host operating system 112. The virtual hypervisor 110 virtualizes the computer system resources and facilitates the operation of the managed machines 104. The hypervisor 110 may provide the illusion of operating at the highest priority level to the guest operating system 106. However, the virtual hypervisor 110 can map the guest operating system's priority level to a priority level lower than the top most priority level. As a result, the virtual hypervisor 110 can intercept the guest operating system 106, and execute instructions that require virtualization assistance. Alternatively, the virtual hypervisor 110 may emulate or actually execute the instructions on behalf of the guest operating system 106. Software steps permitting indirect interaction between the guest operating system 106 and the physical hardware platform 114 can also be performed by the virtual hypervisor 110.

When operating in a virtualized environment, the managed machines 104 present a virtualized environment to the guest operating systems 106, which in turn provide an operating environment for applications 108 and other software constructs.

The computer system 100 includes a policy repository 120 that contains policies. The policies may be security policies that define security rules which can be used by supervisory agents, such as the virtual hypervisor 110 and/or policy enforcers 132 within the managed machines 104, to manage access to resources of the computer system 100. Each of the policies can be associated with one of the virtual machines 104, and can include a plurality of entries that define rules for observable events, actions that are performed responsive to occurrence of the events, and/or the authorized user(s) and/or group(s) who can change policies, initiate actions, and/or participate in actions. The entries can be organized in a defined structure of a policy.

Two or more of the policies can contain similar or identical entries, which may be located within the same or different locations within their structures. As explained above, rules in a security policy can be similar to one another when the nature of the restriction is the same. For example, two different rules can apply to the same command, but can have different parameters. The resulting structure for policies may be large, with repeating or similar rules, and may be cumbersome for analysis by computerized analytical tools and be burdensome to deploy and manage in a computer system.

However, in accordance with various embodiments, the computer system 100 further includes a policy codifier 122 and a policy manager 124. The policy codifier 122 generates (block 400 in FIG. 4) codified policies from policies provided by the policy repository 120. The policy manager 124 manages (block 402 in FIG. 4) access to resources of the computer system 100 responsive to the codified policies. Although the policy manager 124 has been illustrated in FIG. 1 as a separate functional block, some or all of its functionality described herein may be incorporated within or distributed across the virtual hypervisor 110, the policy enforcer 132, and/or other components of the computer system 100.

Figure 2:
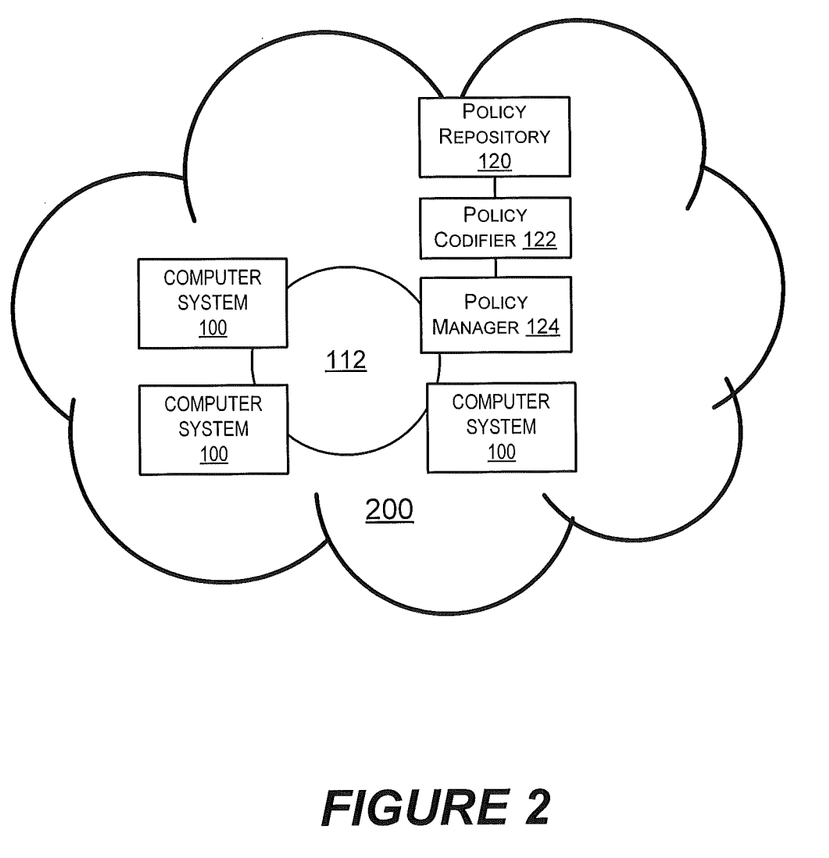
FIG. 2 illustrates a distributed computer environment that manages access to resources responsive to codified policies.

FIG. 2 illustrates a distributed computing environment in which the subject matter of the present disclosure can function. In FIG. 2, computer systems 100 are interconnected by one or more communication networks 112, and may collectively provide a cloud computing environment 200 to users. Each of the computer systems 100 may be configured as shown in FIG. 1, or may be non-virtualized environments including one or more electronic computing devices operable to receive, transmit, process, and store data, and/or any suitable combination of software, firmware, and/or hardware. The network 112 facilitates wireless or wireline communication, and may communicate using, for example, IP packets, Frame Relay frames, Asynchronous Transfer Mode (ATM) cells, voice, video, data, and other suitable information between network addresses. The network 112 may include one or more local area networks (LANs), radio access networks (RANs), metropolitan area networks (MANS), wide area networks (WANs), all or a portion of the global computer network known as the Internet, and/or any other communication system or systems at one or more locations.

In contrast to the embodiment of FIG. 1, the policy repository 120, the policy codifier 122, and/or the policy manager 124 of FIG. 2 may be separate from the computer systems 100 or may be partially within one or more of the computer systems 100. The policies contained in the policy repository 120 may define access privileges by one of the computer systems 100 to resources provided by itself and/or by other computer systems 100. The policy codifier 122 generates (block 400 of FIG. 4) codified policies from policies provided by a policy repository 120. The policy manager 124 manages (block 402 of FIG. 4) access to the defined resources responsive to the codified policies.

The codified policies may replace rules (terms) of a policy with a unique ID, parameters, occurrences, and location of the rules, which jointly define what is referred to herein as the "codified policy DNA." Generation of the codified policy DNA for a policy, such as a security policy, may be performed as follows. First, dedicated symbols, such as numbers, may be substituted for policy terms. A codified policy DNA generation tool can process a security policy and replace security policy terms with dedicated numbers (i.e. semantic substitution). As such, the codified structure can bind many semantically different rules that are created in different languages. For example, assuming a security policy definition language uses the term "allow access group machine 1." This term can be replaced with a string, such as "1-3-4".

When policies have terms that are expressed in different machine and/or human languages, the terms having the same or equivalent functional meaning may be represented by the same symbol or string of symbols. Thus, for example, two policies that contain matching terms having the same functional meaning between the two policies, but which are expressed in two different languages (e.g., first policy has "n" terms expressed in a first language that correspond to and have the same functional meaning as "n" terms in a second policy that are expressed in a second language), the policy codifier 122 can codify those "n" terms in both policies to have the same codified policy DNA. Accordingly, the policy manager 124 may interpret those "n" terms of the two codified policies as being identical. Moreover, when the first and second policies only contain terms that are functionally the same between the two polices, the policy codifier can output the same codified DNA structure for both policies, and the policy manager 124 can treat both policies as being identical.

A semantic dictionary may be added to the policy header to define semantic rules used in generating the codified policy DNA. In particular embodiments, the portion of the dictionary that was codified in the substitution (dictionary of the number to strings/Domain Specific Language (DSL) replacement from the original language it was created in), may be added as a component of the codified DNA policy structure using an extensible markup language (XML) format or other DSL for usage by managed machines. Example: <Allow access>1</Allow access><group>2</group><machine1>4</machine1>.

For example, when the codified policy is communicated (e.g., deployed) to a managed machine 104 (e.g., to an agent thereof), the managed machine 104 can include a policy interpreter 130 and a policy enforcer 132. The policy interpreter 130 can receive the codified policy and translate the codified policy back to a corresponding one of the policies using the embedded dictionary component of the codified DNA policy structure. The policy enforcer 132 can regulate the managed machine's use of the resources of the computer system responsive to the corresponding one of the policies output by the policy interpreter 130.

For the codified policy rules, the occurrences of identical codified numbers may be counted, and the codified data may be de-duplicated using conventional data de-duplication techniques. Moreover, a count ("C#") of the number of duplicate entries may be added. Example: "1-2-4-C1", "1-2-5-C2", "2-4-9-C1", where C1 indicates one occurrence of the entry in the codified policy DNA structure and C2 indicates two occurrences of the entry in the codified policy DNA structure.

Figure 5:
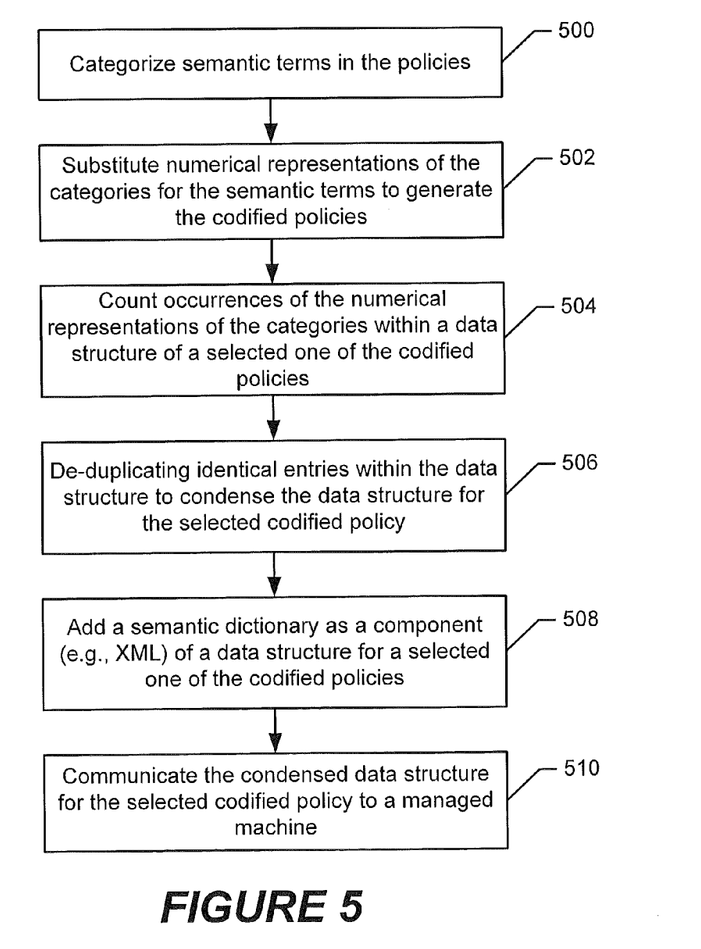

These and other more generalized operations and methods are illustrated by the flowchart of FIG. 5, which may be performed by the policy manager 124. Semantic terms in the policies can be categorized (block 500 of FIG. 5). Numerical representations or other symbolic representations of the categories can be substituted (block 502 of FIG. 5) for the semantic terms to generate the codified policies. The structure for a selected one of the codified policies can be condensed by counting (block 504 of FIG. 5) occurrences of the numerical representations of the categories within the structure of the selected codified policy. The policy manager 124 may de-duplicate (block 506 of FIG. 5) identical entries within the structure to condense the structure for the selected codified policy. A semantic dictionary can be added (block 508 of FIG. 5) as a component of the structure of the selected codified policy. The condensed structure for the selected codified policy can be communicated (block 510 of FIG. 5) to a managed machine (e.g., 104 of FIG. 1 and/or 100 of FIG. 2).

In the embodiment of FIG. 1, the policy interpreter 130 of the managed machine 104 can receive the condensed structure for the selected codified policy, and translate the condensed structure of the codified policy back to the corresponding non-condensed structure for the corresponding policy. The policy enforcer 132 can regulate the managed machine's 104 use of the resources (e.g., one or more resources of the hardware platform 114) of the computer system 100 responsive to the non-condensed structure for the corresponding policy output by the policy interpreter 130.

In some further embodiments, the policy manager 124 manages access to the resources of the computer system 100 responsive to the codified policies by associating (block 600 of FIG. 6) the codified policies with a plurality of the managed machines 104, and determines (block 602 of FIG. 6) which of the codified policies to deploy to which of the managed machines 104 in response to comparing similarity of the codified policies associated with different ones of the managed machines 104.

Figure 6:
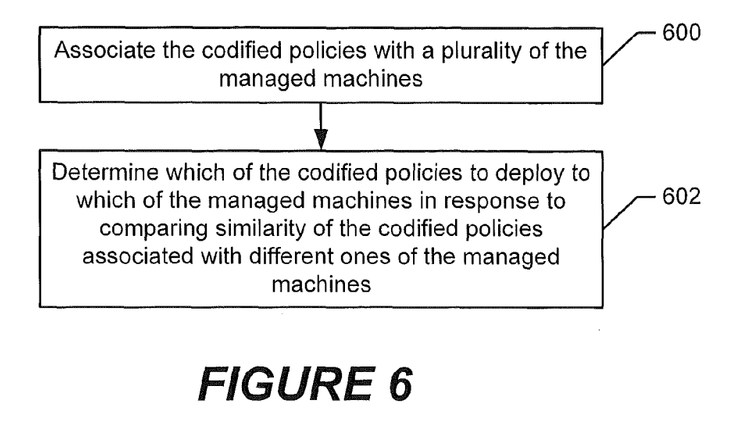
Figure 7:
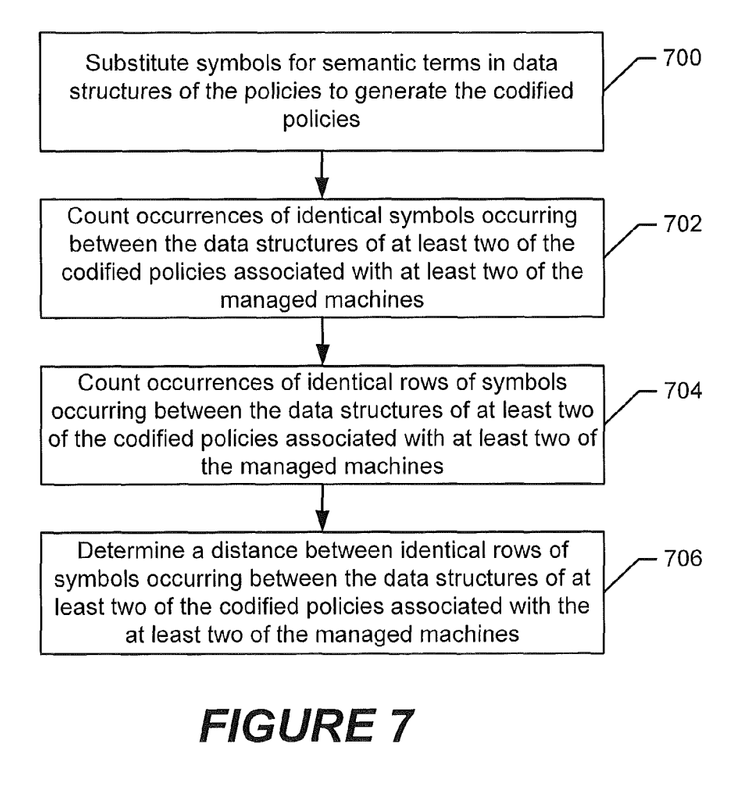

The policy manager may deploy a second one of the codified policies to a particular one of the managed machines in response to identifying at least a threshold difference in similarity between a first one of the codified policies, that was earlier deployed to the particular managed machine, and other codified policies that were deployed to other ones of the managed machines. The policy manager may deploy the second codified policy to any of the managed machines that is determined to have any difference in codified policy relative to a codified policy that was earlier deployed to the other managed machines, and in which case the threshold difference in similarity can be defined as zero.

As explained above, the policy codifier 122 may generate codified policies from the policies provided by the policy repository 120 by substituting (block 700 of FIG. 7) symbols for semantic terms in structures of the policies. The policy manager 124 may compare similarity of the codified policies associated with different ones of the managed machines 104 by counting (block 702 of FIG. 7) identical symbols occurring between the structures of at least two of the codified policies associated with at least two of the managed machines. Alternatively or additionally, the policy manager 124 may compare similarity of the codified policies associated with different ones of the managed machines 104 by counting (block 704 of FIG. 7) identical rows of symbols occurring between the structures of at least two of the codified policies associated with at least two of the managed machines 104.

In some further additional or alternative embodiments, the policy manager 124 may compare similarity of the codified policies associated with different ones of the managed machines 104 by determining (block 706 of FIG. 7) a distance between identical rows of symbols occurring between the structures of the at least two of the codified policies associated with the at least two of the managed machines 104.

Alternatively or additionally, similarity of the codified policies may be determined based on a comparison of how many entries of the compared policies are the same, different, and/or a ratio of the number of same entries to different entries. For example, the level of similarity can be determined based on a finding that the first twenty rows of two compared policies are identical, and that the other following five rows of the policies are different.

The relative occurrence of the same rules/terms within a structure of a codified policy (referred to again as a codified policy DNA structure, below) may be determined so that a distribution of the rules/terms can be used to characterize the codified policy DNA structures, which may facilitate analysis by computerized analytical tools. For example, if a rule codified as 1-2-4 accounts for 25% of the entries in a codified policy DNA structure, a rule codified as 1-2-5 accounts for 50% of the entries in the codified policy DNA structure, and a rule codified as 2-4-9 accounts for 25% of the entries in the codified policy DNA structure, the following entries may be made in the codified policy DNA structure: "1-2-4-W25", "1-2-5-W50", "2-4-9-W25".

The codified policy DNA structure may be sorted according to the statistical distribution appearances (e.g., high count is first/last in the structure). Using the previous example, entries could be sorted in order as "1-2-5-W50", "1-2-4-W25", "2-4-9-W25".

A structure, such as a unified long jagged array structure of the policy rules, may be created that represents the codified policy DNA, in order to reduce space of the structure. As will be understood by those skilled in the art, a jagged array is an array whose elements are themselves arrays.

A level of similarity between different codified policies may be calculated as follows.

Two codified jagged arrays may be compared in terms of:

[a] Content similarity (how many rows are identical, in percentage). Example: 8 out of 16 rows in two different codified policy structure are identical; resulting in output of an indication of 50% content similarity.

[b] Difference in the size of array. Example: 20 rows are identical in two different codified policy structure; resulting in output of an indication of 20 rows.

[c] Order of appearances of rows of the jagged structure—what is the largest distance between rows containing identical codified rules (or symbols). Example: two identical rows are spaced 3 rows apart; resulting in output of a corresponding indication.

One or more of these metrics may be used to compare similarity between two codified policies. For example, two perfectly identical codified policies (e.g. cloned polices) will resulting in the output of a metric of 100=100-0-0 by the policy manager 124, indicating 100 percent identical rows, zero difference in size and zero distance between identical rows.

As another example, the difference between a full policy and an empty policy will result in the policy manager 124 outputting a metric of 0-0-100, indicating zero percent identical rows, zero difference in size, and 100 distance between identical rows.

The resulting output of the comparison of different policies is referred to herein as the target function.

The weighting and comparison of policies can be controlled by an access control system 270 which can recommend where and how to implement and group particular virtual machines for purposes of management. The policy manager 124 (which can function as a comparison server) may be used for overall planning of an entire virtualization environment, and/or for verification of the impact of a proposed change in the deployment of systems on the policy state of existing virtual machines, as well as assisting in modifying the states and locations of the virtual machines.

Managed machines having similar policies, such as similar security policies of risks and levels of security sensitivity, may be grouped into clusters that can be managed as a group. By grouping managed machines with similar security levels in a single cluster, the security of the managed machines within the cluster may be managed more effectively and/or efficiently. Moreover, it may be undesirable to group a managed machine having weak security policies together with managed machines having strong security policies, as the weakest link in a chain is commonly the point of entry of choice by an attacker.

Figure 3:
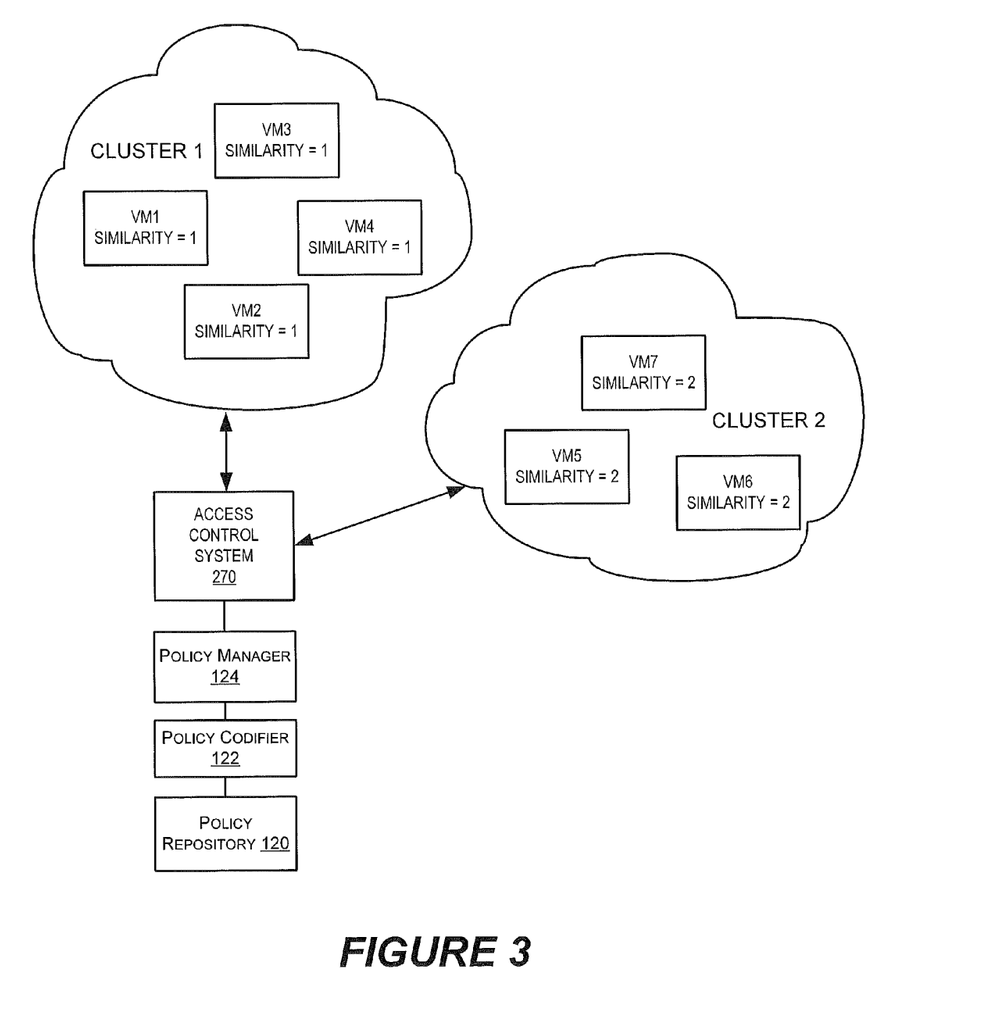
FIG. 3 illustrates clustering of managed virtual machines in a virtual operating environment based on the similarity of associated codified policies.
Figure 4:
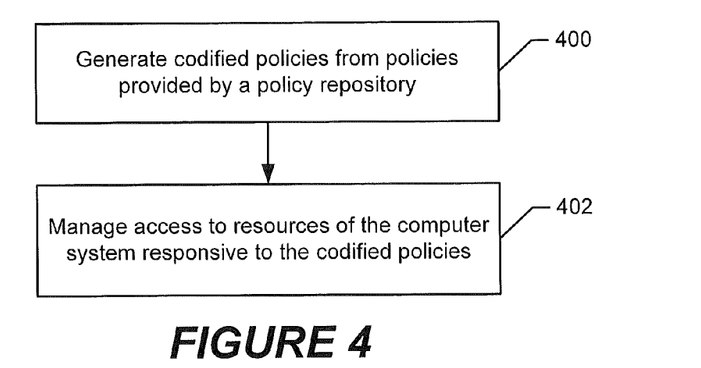
FIGS. 4-7 are flowcharts that illustrate methods and operations for managing access by managed machines to resources of a computer system responsive to codified policies.

FIG. 3 illustrates clustering of managed virtual machines (VMs) in a virtual operating environment based on the similarity of associated codified policies. Referring to FIG. 3, virtual machines VM1 to VM7 are logically grouped into two clusters, Cluster 1 and Cluster 2, by an access control system 270. The access control system 270 may be included within the policy manager 124, and may be separate from the virtual machines, such as shown in FIG. 3, or its functionality may be integrated into one or more of the virtual machines and/or the system(s) hosting the virtual machines, such as described in commonly owned U.S. application Ser. No. 13/611,519 entitled "Managing Security Clusters in Cloud Computing Environments Using Autonomous Security Risk Negotiation Agents", filed Sep. 12, 2012, the disclosure of which is incorporated herein by reference in its entirety.

Virtual machines can be grouped by the access control system 270 into logical clusters for management and/or operational purposes. For example, virtual machines can be grouped into clusters based on load balancing needs, security needs, redundancy needs, or any other needs as determined by a system administrator. The virtual machines grouped within a cluster may or may not all be implemented on a single physical server. Although two clusters are illustrated in FIG. 3, any desired number of clusters can be defined subject to system limitations, and each of the clusters can include any desired number of virtual machines subject to server limitations.

In the example illustrated in FIG. 3, the virtual machines VM1 to VM7 are grouped into clusters based on similarity of codified policies (e.g., codified security policies) associated with the virtual machines VM1 to VM7. Clustered virtual machines may or may not be hosted together on the same computer system 100. However, virtual machines in a cluster may be managed as a group by the access control system 270. As such, there may be some direct or indirect communication between the virtual machines in a cluster and/or the virtual machines in a cluster may share some common resources, such as processing, communication, and/or storage resources.

Cluster 1 includes virtual machines with codified security policies similar to a security policy defined as security policy 1, while and cluster 2 includes virtual machines with codified security policies that are more similar to another security policy 2.

As explained above, policies can be associated with specific ones of the virtual machines. Each time a policy is modified, the policy codifier 122 can re-codify the policy to creating a codified policy DNA, as described above, and which can be stored in the repository 120. The policy manager 124 re-determine similarity between the changed codified policy DNA and one or more of other codified policy DNA of one or more other virtual machines. The access control system 270 can add a virtual machine to an existing cluster, move the virtual machine between two existing clusters, or create a new cluster of virtual machines responsive to the re-determined similarity.

Codification of policies facilitates the use of computerized analytical and optimization tools to conduct similarity analysis between policies, to group managed machines responsive to similarity of their associated codified policies, to provision resources based on the codified policies, to perform trend analysis on changes that occur to policies over time, and/or to proactively detect anomalies occurring in one or more policies by comparison to other policies.

As will be appreciated by one of skill in the art, the present invention may be embodied as a method, data processing system, and/or computer program product. Furthermore, embodiments may take the form of a computer program product on a tangible computer readable storage medium having computer program code embodied in the medium that can be executed by a computer.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computer environment or offered as a service such as a Software as a Service (SaaS).

Some embodiments are described herein with reference to flowchart illustrations and/or block diagrams of methods, systems and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall support claims to any such combination or subcombination.

In the drawings and specification, there have been disclosed typical embodiments and, although specific terms are employed, they are used in a generic and descriptive sense only and not for purposes of limitation, the scope of the invention being set forth in the following claims.

The invention claimed is:

1. A computer system comprising:
   processor circuit; and
   memory device coupled to the processor circuit and comprising computer readable program code that when executed by the processor circuit causes the processor circuit to perform operations comprising:
      accessing a policy repository that contains policies to manage access to resources of the computer system;
      generating codified policies from the policies, wherein the generating comprises:
         categorizing semantic terms in the policies, and
         substituting representations of the categories for the semantic terms to generate the codified policies; and
      condensing a structure of a selected one of the codified policies by de-duplicating identical entries within the structure;
      communicating the condensed structure for the selected codified policy to a managed machine to manage access to resources of the computer system used by the managed machine.

2. The computer system of claim 1, wherein the operations further comprise:
   adding a semantic dictionary as a component of a message containing the condensed structure for the selected one of the codified policies, and
   communicating the message to the managed machine.

3. The computer system of claim 2, wherein the operations further comprise generating the semantic dictionary using a Domain Specific Language.

4. The computer system of claim 1, further comprising a plurality of managed machines, each of the managed machines receives a codified policy from the processor circuit, translates the codified policy back to a corresponding one of the policies, and regulates its use of the resources of the computer system responsive to the corresponding one of the policies.

5. A computer system comprising:
   processor circuit; and memory device coupled to the processor circuit and comprising computer readable program code that when executed by the processor circuit causes the processor circuit to perform operations comprising:
  accessing a policy repository that contains policies to manage access to resources of the computer system;
  generating codified policies from the policies, wherein the generating comprises:
    categorizing semantic terms in the policies, and
    substituting representations of the categories for the semantic terms to generate the codified policies; and
  associating the codified policies with a plurality of managed machines;
  selecting among the codified policies to communicate to selected ones of the managed machines in response to comparing similarity of the codified policies associated with different ones of the managed machines; and
  communicating the selected codified policies to the selected ones of the managed machines.

6. The computer system of claim 5, wherein selecting among the codified policies to communicate to selected ones of the managed machines in response to comparing similarity of the codified policies associated with different ones of the managed machines, comprises communicating a second one of the codified policies to a particular one of the managed machines in response to identifying at least a threshold difference in similarity between a first one of the codified policies, that was earlier communicated to the particular managed machine, and other codified policies that were deployed to other ones of the managed machines.

7. The computer system of claim 5, wherein:
  substituting representations of the categories for the semantic terms to generate the codified policies, comprises substituting symbols for semantic terms in structures of the policies to generate the codified policies; and
  comparing similarity of the codified policies associated with different ones of the managed machines, comprises counting occurrences of identical symbols occurring between the structures of at least two of the codified policies associated with at least two of the managed machines to compare similarity of the at least two of the codified policies.

8. The computer system of claim 5, wherein:
  substituting representations of the categories for the semantic terms to generate the codified policies, comprises substituting symbols for semantic terms in structures of the policies to generate the codified policies; and
  comparing similarity of the codified policies associated with different ones of the managed machines, comprises counting occurrences of identical rows of symbols occurring between the structures of at least two of the codified policies associated with at least two of the managed machines to compare similarity of the at least two of the codified policies.

9. The computer system of claim 8, wherein:
  the operations further comprise determining distances between identical rows of symbols occurring in the structures of first and second of the codified policies associated with the first and second of the managed machines to compare similarity of the first and second codified policies.

10. The computer system of claim 5, wherein:
  the operations further comprise comparing sizes of structures of first and second of the codified policies associated with first and second of the managed machines to compare similarity of the first and second codified policies.

11. A method of operating a computer system, the method comprising:
  accessing a policy repository that contains policies to manage access to resources of the computer system;
  generating codified policies from the policies, wherein the generating comprises:
    categorizing semantic terms in the policies, and
    substituting representations of the categories for the semantic terms to generate the codified policies; and
  condensing a structure of a selected one of the codified policies by de-duplicating identical entries within the structure;
  communicating the condensed structure for the selected codified policy to a managed machine to manage access to resources of the computer system used by the managed machine.

12. The method of claim 11, further comprising:
  adding a semantic dictionary as a component of a message containing the condensed structure for the selected one of the codified policies; and
  communicating the message to the managed machine.

13. A method of operating a computer system, the method comprising:
  accessing a policy repository that contains policies to manage access to resources of the computer system;
  generating codified policies from the policies, wherein the generating comprises:
    categorizing semantic terms in the policies, and
    substituting representations of the categories for the semantic terms to generate the codified policies; and
  associating the codified policies with a plurality of managed machines;
  selecting among the codified policies to communicate to selected ones of the managed machines in response to comparing similarity of the codified policies associated with different ones of the managed machines; and
  communicating the selected codified policies to the selected ones of the managed machines.

14. The method of claim 13, wherein:
  substituting representations of the categories for the semantic terms to generate the codified policies, comprises substituting symbols for semantic terms in structures of the policies to generate the codified policies; and
  comparing similarity of the codified policies associated with different ones of the managed machines comprises counting occurrences of identical symbols occurring between the structures of at least two of the codified policies associated with at least two of the managed machines.

15. The method of claim 13, wherein:
  substituting representations of the categories for the semantic terms to generate the codified policies, comprises substituting symbols for semantic terms in structures of the policies to generate the codified policies; and
  comparing similarity of the codified policies associated with different ones of the managed machines comprises determining a distance between identical rows of symbols occurring between the structures of the at least two of the codified policies associated with the at least two of the managed machines.

16. The method of claim 13, wherein:
  substituting representations of the categories for the semantic terms to generate the codified policies, comprises substituting symbols for semantic terms in structures of the policies to generate the codified policies; and comparing similarity of the codified policies associated with different ones of the managed machines comprises counting occurrences of identical rows of symbols occurring between the structures of at least two of the codified policies associated with at least two of the managed machines.

* * * * *